United States Patent
Priyadarshy

(10) Patent No.: US 10,597,995 B2
(45) Date of Patent: Mar. 24, 2020

(54) VISUALIZATION OF QUANTITATIVE DRILLING OPERATIONS DATA RELATED TO A STUCK PIPE EVENT

(71) Applicant: LANDMARK GRAPHICS CORPORATION, Houston, TX (US)

(72) Inventor: Satyam Priyadarshy, Katy, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 102 days.

(21) Appl. No.: 15/558,146

(22) PCT Filed: Jun. 26, 2015

(86) PCT No.: PCT/US2015/038025
§ 371 (c)(1),
(2) Date: Sep. 13, 2017

(87) PCT Pub. No.: WO2016/209271
PCT Pub. Date: Dec. 29, 2016

(65) Prior Publication Data
US 2018/0047191 A1 Feb. 15, 2018

(51) Int. Cl.
| | |
|---|---|
| *E21B 44/00* | (2006.01) |
| *G06Q 50/08* | (2012.01) |
| *G06Q 10/06* | (2012.01) |
| *E21B 21/08* | (2006.01) |
| *E21B 45/00* | (2006.01) |
| *E21B 47/06* | (2012.01) |
| *E21B 49/00* | (2006.01) |
| *G06T 11/20* | (2006.01) |
| *G08B 21/18* | (2006.01) |

(52) U.S. Cl.
CPC .............. *E21B 44/00* (2013.01); *E21B 21/08* (2013.01); *E21B 45/00* (2013.01); *E21B 47/06* (2013.01); *E21B 49/00* (2013.01); *G06Q 10/0639* (2013.01); *G06Q 50/08* (2013.01); *G06T 11/206* (2013.01); *G08B 21/182* (2013.01)

(58) Field of Classification Search
CPC ..... G06T 11/206; G08B 21/182; E21B 49/00; E21B 47/06; E21B 44/00; E21B 21/08; E21B 45/00; G06Q 10/0639; G06Q 50/08
See application file for complete search history.

(56) References Cited

U.S. PATENT DOCUMENTS

| 5,508,915 A | 4/1996 | Tsao et al. |
|---|---|---|
| 7,128,167 B2 | 10/2006 | Dunlop et al. |
| 2002/0103630 A1 | 8/2002 | Aldred et al. |
| 2009/0089028 A1 | 4/2009 | Sagert et al. |

(Continued)

FOREIGN PATENT DOCUMENTS

| EP | 0354716 A1 | 2/1990 |
|---|---|---|
| WO | 2014066981 A1 | 8/2014 |

OTHER PUBLICATIONS

International Search Report and Written Opinion; PCT Application No. PCT/US2015/038025; dated Mar. 15, 2016.

(Continued)

*Primary Examiner* — Brad Harcourt
(74) *Attorney, Agent, or Firm* — Polsinelli PC

(57) ABSTRACT

Systems and methods for visualization of quantitative drilling operations data related to a stuck pipe event using scaled data values for each attribute of interest, a scaled predetermined threshold value for each attribute of interest and an average value of the scaled data values for each attribute of interest.

18 Claims, 3 Drawing Sheets

(56) References Cited

U.S. PATENT DOCUMENTS

| | | |
|---|---|---|
| 2011/0283219 A1 | 11/2011 | Pandey |
| 2014/0100486 A1 | 4/2014 | Alberts |
| 2014/0110167 A1 | 4/2014 | Goebel et al. |
| 2014/0116776 A1 | 5/2014 | Marx et al. |
| 2014/0182844 A1 | 7/2014 | Wutherich et al. |
| 2014/0299378 A1 | 10/2014 | Abbassian et al. |

OTHER PUBLICATIONS

A Visual Analytics Approach to Segmenting and Labeling Multivariate Time Series Data; EuroVis Workshop on Visual Analytics, 2014, Alsallakh, et.al.

Search Report; French Application No. 1654633 dated Jan. 30, 2019.

Biegler, M.W. et al., "Advances in Prediction of Stuck Pipe Using Multivariate Statistical Analysis", SPE/IADC Drilling Conference, Feb. 15-18, Dallas, Texas; Society of Petroleum Engineers; Feb. 14, 1994; abstract only.

Nybo, Roar, "Efficient Drilling Problem Detection", Thesis for the degree of Philosophiae Doctor; Sep. 1, 2009; Norwegian University of Science and Technology; ISBN: 978-82-471-1098-0.

VISUALIZATION OF QUANTITATIVE DRILLING OPERATIONS DATA RELATED TO A STUCK PIPE EVENT

CROSS-REFERENCE TO RELATED APPLICATIONS

This application is a national stage entry of PCT/US2015/038025 filed Jun. 26, 2015, said application is expressly incorporated herein in its entirety.

FIELD OF THE DISCLOSURE

The present disclosure generally relates to systems and methods for visualization of quantitative drilling operations data related to a stuck pipe event. More particularly, the present disclosure relates to systems and methods for visualization of quantitative drilling operations data related to a stuck pipe event using scaled data values for each attribute of interest, a scaled predetermined threshold value for each attribute of interest and an average value of the scaled data values for each attribute of interest.

BACKGROUND

In drilling operations, a stuck pipe event refers to when the drill string is stuck. There are multiple factors that can lead to a stuck pipe event. The variability of these multiple factors makes it difficult to visualize them in a comprehensive plot on a graph that can be readily and easily understood-particularly when the underlying data relating to a stuck pipe event is represented by various different attributes and units. Traditional plots thus, often require one or two separate variable plots and do not provide a holistic view of the important data attributes that could lead to stuck pipe event.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1A:
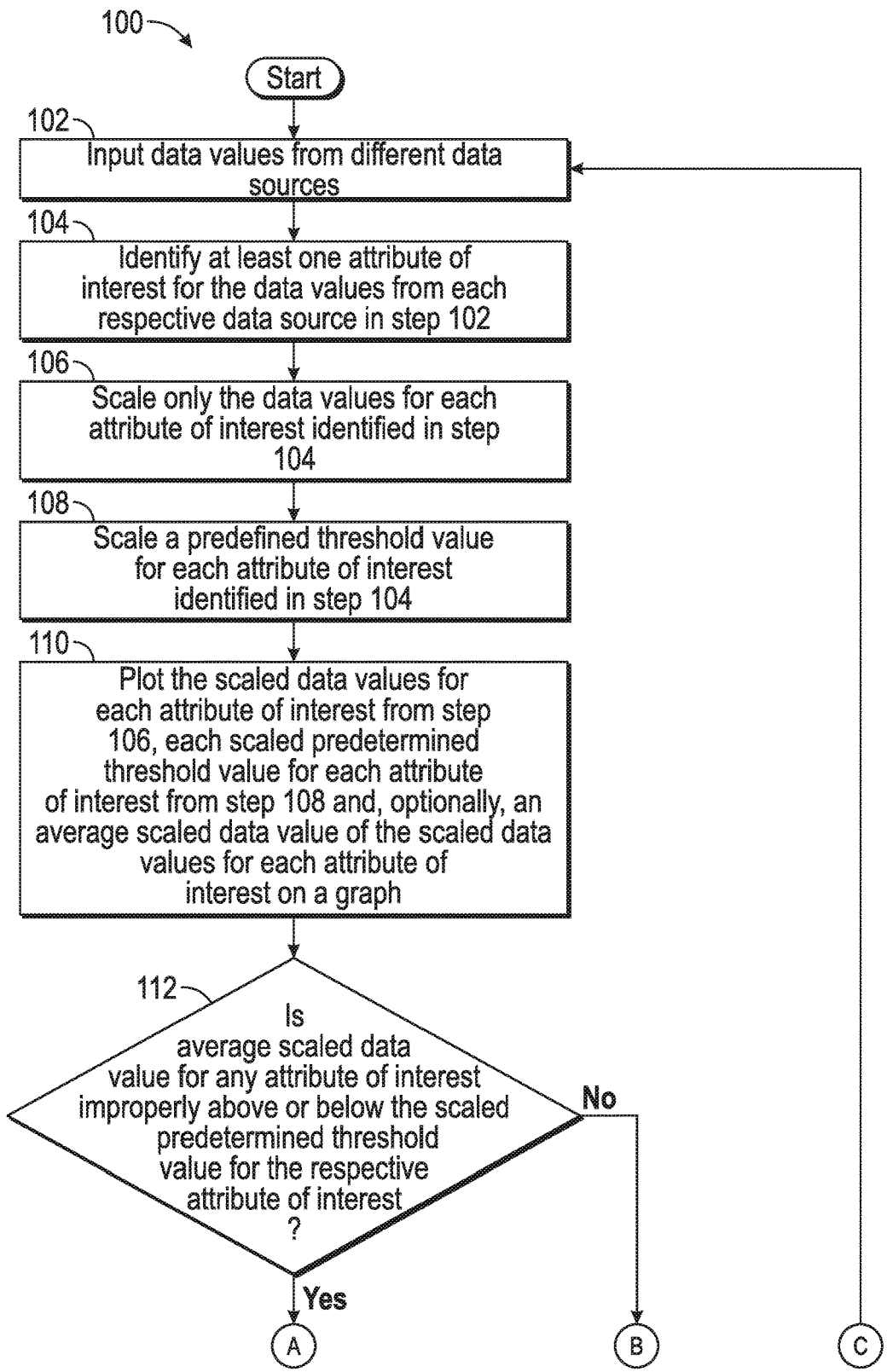
FIGS. 1A-1B are a flow diagram illustrating one embodiment of a method for implementing the present disclosure.

The present disclosure overcomes one or more deficiencies in the prior art by providing systems and methods for visualization of quantitative drilling operations data related to a stuck pipe event using scaled data values for each attribute of interest, a scaled predetermined threshold value for each attribute of interest and an average value of the scaled data values for each attribute of interest.

In one embodiment, the present disclosure includes a method for visualization of quantitative drilling operations data related to a stuck pipe event, which comprises: a) identifying at least one attribute of interest for data values from each respective data source; b) scaling only each data value for each attribute of interest; c) scaling a predefined threshold value for each attribute of interest; and d) plotting each scaled data value for each attribute of interest and each scaled predetermined threshold value for each attribute of interest on a graph using a computer processor.

In another embodiment, the present disclosure includes a non-transitory program carrier device tangibly carrying computer executable instructions for visualization of quantitative drilling operations data related to a stuck pipe event, the instructions being executable to implement: a) identifying at least one attribute of interest for data values from each respective data source; b) scaling only each data value for each attribute of interest; c) scaling a predefined threshold value for each attribute of interest; and d) plotting each scaled data value for each attribute of interest and each scaled predetermined threshold value for each attribute of interest on a graph.

In yet another embodiment, the present disclosure includes a non-transitory program carrier device tangibly carrying computer executable instructions for visualization of quantitative drilling operations data related to a stuck pipe event, the instructions being executable to implement: a) identifying at least one attribute of interest for data values from each respective data source; b) scaling each data value for each attribute of interest; c) scaling a predefined threshold value for each attribute of interest; d) plotting each scaled data value for each attribute of interest and each scaled predetermined threshold value for each attribute of interest on a graph; and e) plotting an average scaled data value for each attribute of interest on the graph.

The subject matter of the present disclosure is described with specificity, however, the description itself is not intended to limit the scope of the disclosure. The subject matter thus, might also be embodied in other ways, to include different structures, steps and/or combinations similar to those described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries (e.g. drilling water wells) to achieve similar results.

Method Description

Figure 1B:
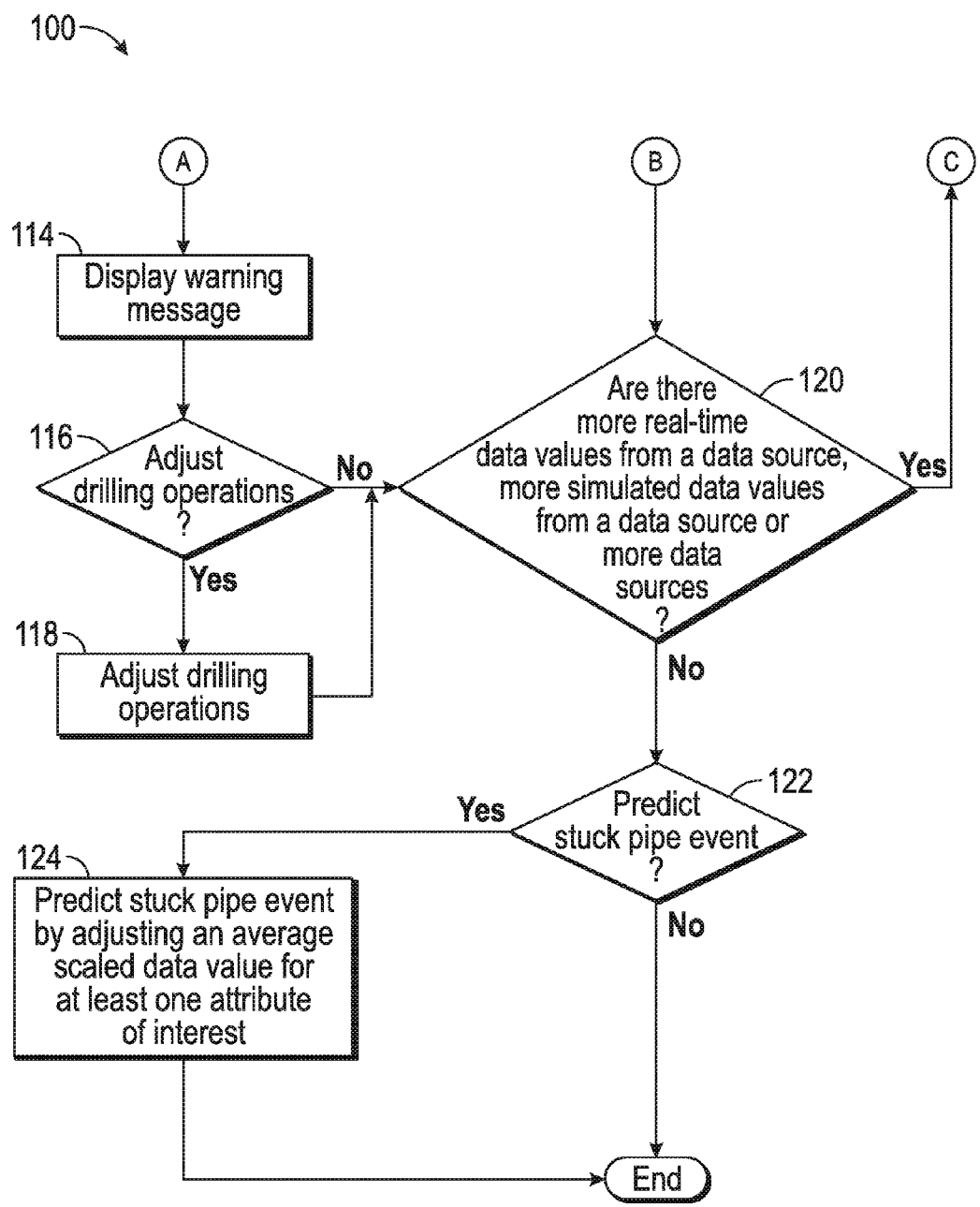

Referring now to FIGS. 1A-1B, a flow diagram illustrates one embodiment of a method 100 for implementing the present disclosure. The method 100 enables the display of data values from one or more different data sources related to drilling operations for one or more wells in an easy manner for domain experts to make sense of multi-variable, multi-variate data related to the drilling operations.

Figure 3:
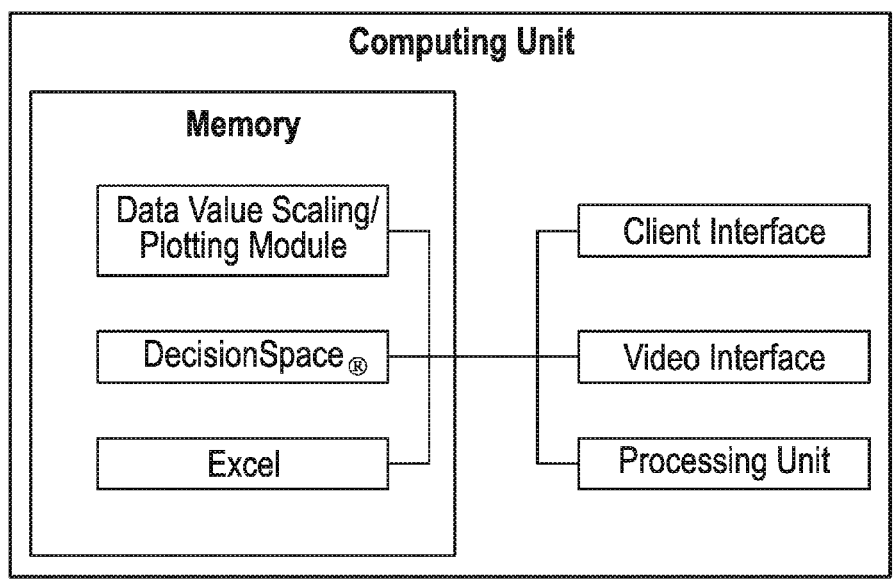
FIG. 3 is a block diagram illustrating one embodiment of a computer system for implementing the present disclosure.

In step 102, data values from one or more different data sources related to drilling operations for one or more wells are input using the client interface and/or the video interface described further in reference to FIG. 3. Data sources may include, for example: subsurface drilling operations, basic subsurface formation characteristics, drilling chemistry, surface drilling operations and drilling team resources. The data values from the data sources may comprise real-time, historical and/or simulated (e.g. calculated) and predicted (using statistical methods, machine learning algorithms and/or scientific theories) data values.

In step 104, at least one attribute of interest is identified for the data values from each respective data source in step 102 using the client interface and/or the video interface described further in reference to FIG. 3. Preferably, multiple attributes of interest are identified. The exemplary data sources described in reference to step 102 may include the following attributes of interest among others: subsurface drilling operations (depth, drag, friction factor), basic subsurface formation characteristics (porosity, permeability, weight-on-bit (WOB)), drilling chemistry (pore pressure, inbound fluid pressure, return fluid pressure), surface drilling operations (hook load, drilling revolutions per minute (RPM), torque) and drilling team resources (years of experience, shift hours, reporting time for problems).

In step 106, only the data values for each attribute of interest identified in step 104 are scaled using techniques well known in the art to reduce the data values with different units to a common scale.

In step 108, a predetermined threshold value for each attribute of interest identified in step 104 is scaled using techniques well known in the art to reduce the predetermined threshold values with different units to a common scale. The predetermined threshold value is often a well-known value at which the data values for the respective attribute of interest should not go above or below.

Figure 2:
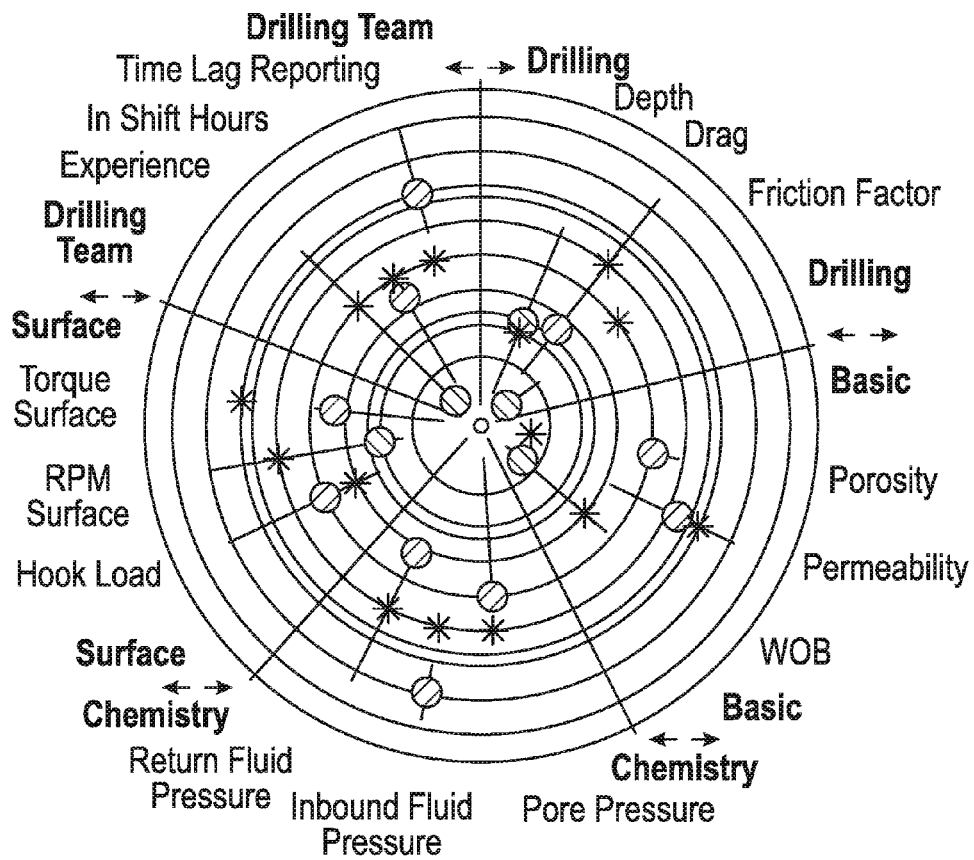
FIG. 2 is an exemplary graph illustrating step 110 in FIG. 1A.

In step 110, the scaled data values for each attribute of interest from step 106, the scaled predetermined threshold value for each attribute of interest from step 108 and, optionally, an average scaled data value of the scaled data values for each attribute of interest are plotted on a graph and displayed using the video interface described further in reference to FIG. 3. In FIG. 2, the exemplary graph illustrates a plot of scaled data values (lines) for each attribute of interest for the exemplary data sources described step 104, the scaled predetermined threshold value (asterisks) for each attribute of interest for the exemplary data sources described in step 104 and an average scaled data value of the scaled data values (circles) for each attribute of interest for the exemplary data sources described in step 104. Other forms of a graph may be used as well as different symbols than those used in FIG. 2. In addition, the symbols could be color coded or sized appropriately to bring another dimension to the data. For example, a symbol can represent a predicted data value to illustrate how it compares to the actual data value. Regardless of the form of graph and symbols used, the method 100 enables the display of a large number of data values from different data sources related to drilling operations for one or more wells in a single graph or a set of graphs for time and/or zone comparative views of their impact on the probability of a stuck pipe event. The displayed graph(s) may also be used to overlay the modeled or simulated data values from other models.

In step 112, the method 100 determines if the average scaled data value for any attribute of interest is improperly above or below the scaled predetermined threshold value for the respective attribute of interest. If the average scaled data value for any attribute of interest is not improperly above or below the scaled predetermined threshold value for the respective attribute of interest, then the method 100 proceeds to step 120. Otherwise, the method 100 proceeds to step 114.

In step 114, a warning message is displayed using the video interface described further in reference to FIG. 3 that indicates the average scaled data value for the attribute of interest is improperly above or below the scaled predetermined threshold value for the respective attribute of interest.

In step 116, the method 100 determines whether drilling operations should be adjusted based on the warning message displayed in step 114. If drilling operations do not need to be adjusted, then the method 100 proceeds to step 120. Otherwise, the method 100 proceeds to step 118.

In step 118, drilling operations are adjusted using the client interface and/or the video interface described further in reference to FIG. 3 and techniques well known in the art.

In step 120, the method 100 determines whether there are more real-time data values for a data source, more simulated data values for a data source or more data sources. If there are more real-time data values for a data source, more simulated data values for a data source or more data sources, then the method 100 returns to step 102. Otherwise, the method 100 proceeds to step 122. As the method 100 repeats with each iteration, the graph(s) displayed as a result of step 110 may change in real-time. By scaling only the data values for each attribute of interest in step 106 and the predetermined threshold value for each respective attribute of interest in step 108 with each iteration of the method 100, the input data value units become irrelevant and the insight needed to efficiently display a comprehensive view of the drilling operations is enabled.

In step 122, the method 100 determines whether a stuck pipe event should be predicted. If a stuck pipe event should be predicted, then the method 100 proceeds to step 124. Otherwise, the method 100 ends.

In step 124, a stuck pipe event is predicted by adjusting an average scaled data value for at least one attribute of interest using the client interface and/or the video interface described further in reference to FIG. 3 and techniques well known in the art. The method 100 then ends.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 3, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-2. The memory therefore, includes a data value scaling/plotting module, which enables steps 108 and 112-118 described in reference to FIGS. 1A-1B. The data value scaling/plotting module may integrate functionality from the remaining application programs illustrated in FIG. 3. In particular, DecisionSpace® may be used as an interface application to perform steps 102-106 and 120-124 in FIGS. 1A-113. And, Excel, or some other data visualization and plotting program, may be used as an interface application to perform the plotting in step 110 of FIG. 1A. Although DecisionSpace® and Excel may be used as interface applications, other interface applications may be used, instead, or the data value scaling/plotting module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for visualization of quantitative drilling operations data related to a stuck pipe event, which comprises:
   a) identifying at least one attribute of interest for data values from each respective data source;
   b) scaling only each data value for each attribute of interest;
   c) scaling a predefined threshold value for each attribute of interest; and
   d) plotting each scaled data value for each attribute of interest and each scaled predetermined threshold value for each attribute of interest on a graph using a computer processor;
   e) displaying a warning message for each average scaled data value that is improperly above or below the scaled predetermined threshold value for each respective attribute of interest; and
   f) adjusting drilling operations based on each warning message displayed.

2. The method of claim 1, further comprising plotting an average scaled data value for each attribute of interest on the graph based on each scaled data value for each respective attribute of interest.

3. The method of claim 1, wherein each data value is one of a real-time data value and a simulated data value.

4. The method of claim 3, further comprising repeating steps a)-d) until there are no more real-time data values from each respective data source, no more simulated data values from each respective data source and no more data sources.

5. The method of claim 1, further comprising:
   displaying the graph.

6. The method of claim 1, further comprising predicting a stuck pipe event by adjusting the average scaled data value for at least one attribute of interest.

7. The method of claim 1, wherein at least one data source includes one of subsurface drilling operations, basic subsurface formation characteristics, drilling chemistry, surface drilling operations and drilling team resources.

8. The method of claim 7, wherein at least one attribute of interest from a respective data source includes one of i) depth, drag, friction factor for subsurface drilling operations; ii) porosity, permeability, weight-on-bit for basic subsurface formation characteristics; iii) pore pressure, inbound fluid pressure, return fluid pressure for drilling chemistry; iv) hook load, drilling revolutions per minute, torque for surface drilling operations; and v) years of experience, shift hours, reporting time of problems for drilling team resources.

9. A non-transitory program carrier device tangibly carrying computer executable instructions for visualization of quantitative drilling operations data related to a stuck pipe event, the instructions being executable to implement:
   a) identifying at least one attribute of interest for data values from each respective data source;
   b) scaling only each data value for each attribute of interest;
   c) scaling a predefined threshold value for each attribute of interest; and
   d) plotting each scaled data value for each attribute of interest and each scaled predetermined threshold value for each attribute of interest on a graph;
   e) displaying a warning message for each average scaled data value that is improperly above or below the scaled predetermined threshold value for each respective attribute of interest; and
   f) adjusting drilling operations based on each warning message displayed.

10. The program carrier device of claim 9, further comprising plotting an average scaled data value for each attribute of interest on the graph based on each scaled data value for each respective attribute of interest.

11. The program carrier device of claim 9, wherein each data value is one of a real-time data value and a simulated data value.

12. The program carrier device of claim 11, further comprising repeating steps a)-d) until there are no more real-time data values from each respective data source, no more simulated data values from each respective data source and no more data sources.

13. The program carrier device of claim 9 further comprising:
   displaying the graph.

14. The program carrier device of claim 9, further comprising predicting a stuck pipe event by adjusting the average scaled data value for at least one attribute of interest.

15. The program carrier device of claim 9, wherein at least one data source includes one of subsurface drilling operations, basic subsurface formation characteristics, drilling chemistry, surface drilling operations and drilling team resources.

16. The program carrier device of claim 15, wherein at least one attribute of interest from a respective data source includes one of i) depth, drag, friction factor for subsurface drilling operations; ii) porosity, permeability, weight-on-bit for basic subsurface formation characteristics; iii) pore pressure, inbound fluid pressure, return fluid pressure for drilling chemistry; iv) hook load, drilling revolutions per minute, torque for surface drilling operations; and v) years of experience, shift hours, reporting time of problems for drilling team resources.

17. A non-transitory program carrier device tangibly carrying computer executable instructions for visualization of quantitative drilling operations data related to a stuck pipe event, the instructions being executable to implement:
   a) identifying at least one attribute of interest for data values from each respective data source;
   b) scaling each data value for each attribute of interest;
   c) scaling a predefined threshold value for each attribute of interest;
   d) plotting each scaled data value for each attribute of interest and each scaled predetermined threshold value for each attribute of interest on a graph; and
   e) plotting an average scaled data value for each attribute of interest on the graph;
   f) displaying a warning message for each average scaled data value that is improperly above or below the scaled predetermined threshold value for each respective attribute of interest; and
   g) adjusting drilling operations based on each warning message displayed.

18. The program carrier device of claim 17, further comprising displaying a warning message for each average scaled data value that is improperly above or below the scaled predetermined threshold value for each respective attribute of interest.

* * * * *